(12) United States Patent
Boddy et al.

(10) Patent No.: US 6,364,496 B1
(45) Date of Patent: Apr. 2, 2002

(54) SHAPE MEMORY ALLOY REARVIEW MIRROR

(75) Inventors: Ian Boddy, Ada; Keith D. Foote, Kentwood; James A. Ruse, Allegan, all of MI (US)

(73) Assignee: Magna Mirror Systems, Inc., Alto, MI (US)

( * ) Notice: Subject to any disclaimer, the term of this patent is extended or adjusted under 35 U.S.C. 154(b) by 0 days.

(21) Appl. No.: 09/830,125

(22) PCT Filed: Oct. 22, 1999

(86) PCT No.: PCT/US99/24042
§ 371 Date: Apr. 23, 2001
§ 102(e) Date: Apr. 23, 2001

(87) PCT Pub. No.: WO00/25164
PCT Pub. Date: May 4, 2000

Related U.S. Application Data

(60) Provisional application No. 60/105,434, filed on Oct. 23, 1998.

(51) Int. Cl.[7] .............................................. G02B 7/182
(52) U.S. Cl. ........................ 359/877; 359/876; 248/476; 248/483
(58) Field of Search ................................. 359/841, 872, 359/873, 874, 876, 877; 248/476, 479, 483

(56) References Cited

U.S. PATENT DOCUMENTS

| | | | |
|---|---|---|---|
| 4,027,953 A | * 6/1977 | Jacob | 359/877 |
| 4,626,085 A | 12/1986 | Suzuki | |
| 5,014,520 A | 5/1991 | Orner et al. | 62/187 |
| 5,092,781 A | 3/1992 | Casciotti et al. | 439/62 |
| 5,166,832 A | * 11/1992 | Zychowicz | 359/841 |
| 5,747,993 A | 5/1998 | Jacobsen et al. | 324/109 |
| 6,069,420 A | * 5/2000 | Mizzi et al. | 310/40 MM |

* cited by examiner

Primary Examiner—Mark A. Robinson
(74) Attorney, Agent, or Firm—Clark Hill PLC

(57) ABSTRACT

A rearview mirror assembly having a pivot structure and first and second pairs of helical structures consisting of shape memory alloy wires which serve to adjust the position of the mirror. The wires may be individually heated by conducting an electrical current to effect the contracted memory position. When the current is switched off, a wire cools and can easily be stretched to mechanically transform the wire to a martensitic phase.

10 Claims, 8 Drawing Sheets

SHAPE MEMORY ALLOY REARVIEW MIRROR

This appln is a 371 of PCT/US99/24042 filed Oct. 22, 1999, which claims benefit of Provisional No. 60/105,434 filed Oct. 23, 1998.

FIELD OF THE INVENTION

This invention relates to a power operated rearview mirror assembly for a motor vehicle.

DESCRIPTION OF THE PRIOR ART

Motor vehicles include rearview mirror assemblies mounted externally on a vehicle on one or both front doors to help the driver see rearwardly of the vehicle. These rearview mirror assemblies typically have an adjustable mirror portion mounted therein that can be remotely controlled to be repositioned to accommodate different vehicle operators. Such rearview mirrors are remotely controlled from inside the vehicle by a mechanical connection or an electrical connection. Electrically powered actuators are frequently included in rearview mirror assemblies to reposition the mirror remotely in response to remotely controlled electrical signals. Such mirror assemblies are expensive and require extensive labor for fabrication.

SUMMARY OF THE INVENTION AND ADVANTAGES

To achieve the goals of reducing complexity, expense and labor for fabrication, there is disclosed and described herein a rearview mirror that includes a shape memory alloy to effect the repositioning of a mirror.

The rearview mirror includes a supporting assembly for attachment to a vehicle structure and a mirror assembly with a pivot structure between the assemblies for pivoting the mirror assembly relative to the supporting assembly about first and second perpendicular intersecting axes. A first electrically actuated moving mechanism pivots the mirror assembly relative to the supporting assembly and is characterized by including a temperature sensitive element consisting of an alloy which undergoes thermoelastic, martensitic phase transformation in response to heat and reacting between the assemblies for straining the element during a first phase and for unstraining the element during a second phase. Also included is a supply of electrical power for heating the element and causing the phase transformation of the element to unstrain the elementing thereof to move the mirror assembly relative to the supporting assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
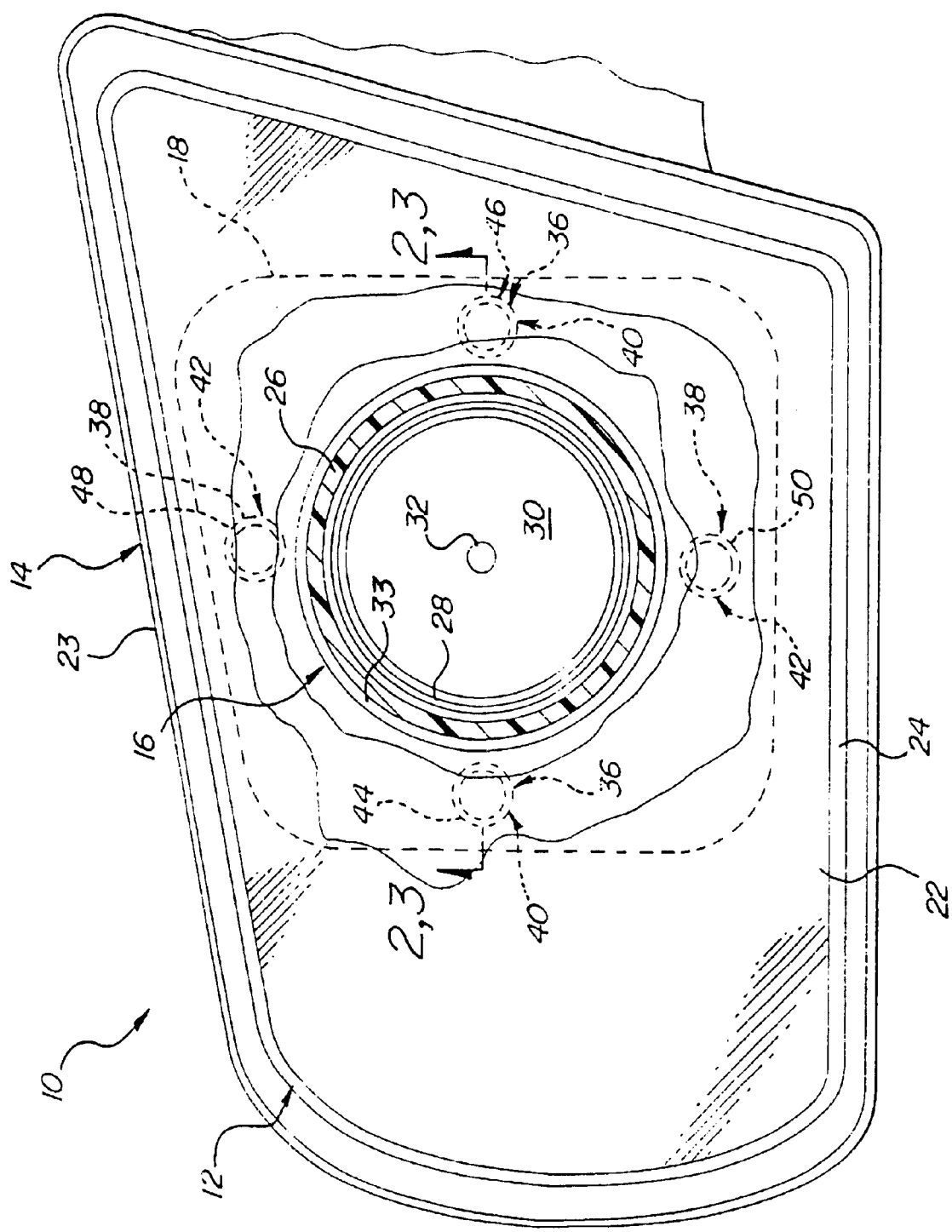
FIG. 1 is a fragmentary elevational view looking forwardly at the rear of a rearview mirror assembly which embodies the principles of the present invention with portions thereof broken away to show a pivot structure.
Figure 2:
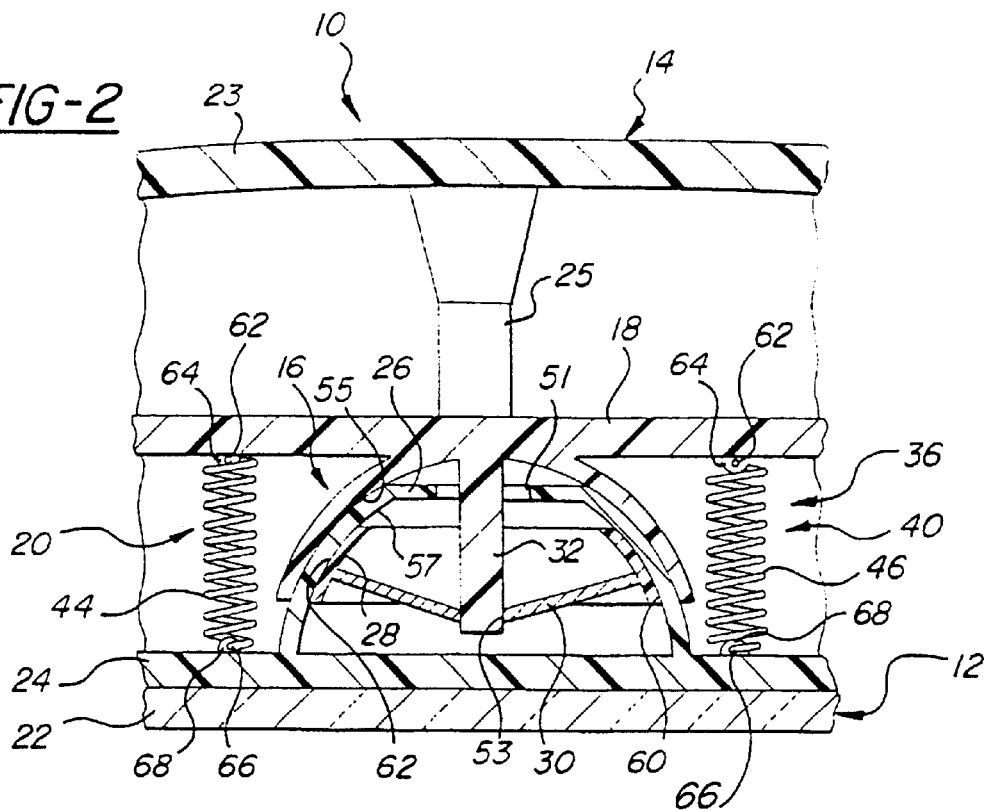
FIG. 2 is a sectional view taken along the line 2—2 in FIG. 1 showing a power operated mirror moving mechanism in a first position.
Figure 3:
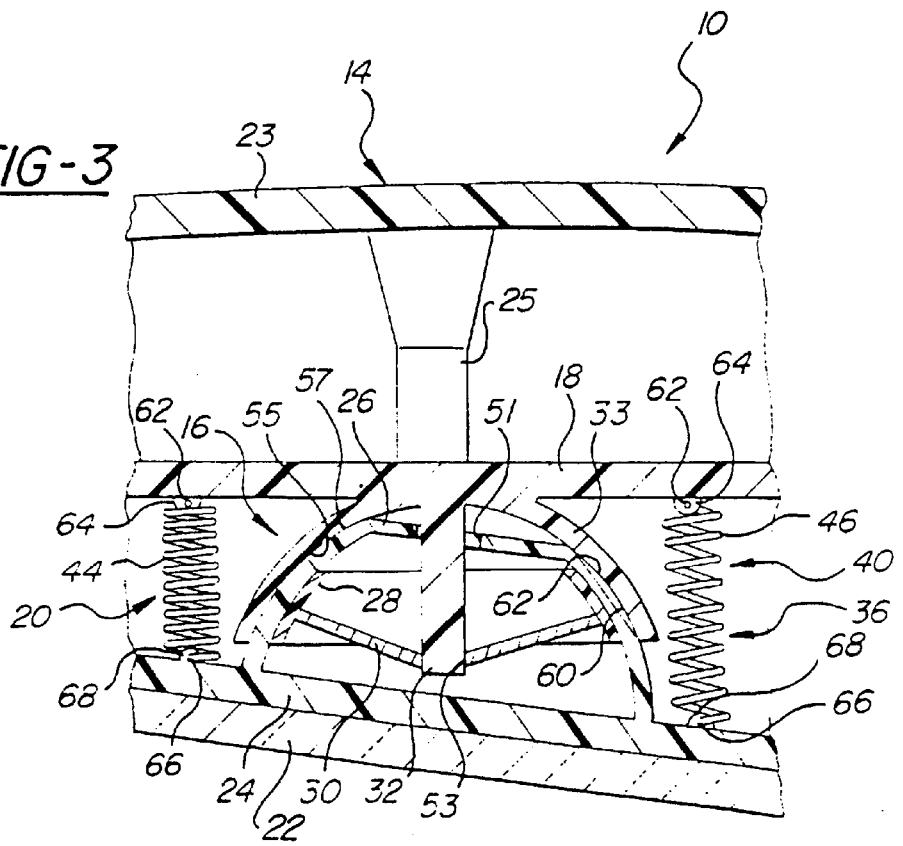
FIG. 3 is a sectional view taken along the line 3—3 in FIG. 1 showing a power operated mirror moving mechanism in a second position.

Referring to the Figures, wherein like numerals indicate like or corresponding parts throughout the several views, there is shown in FIGS. 1–3 the preferred embodiment and best mode of a rearview mirror assembly, generally designated 10, which embodies the principles of the present invention. The rearview mirror 10 includes a mirror assembly, generally designated 12 pivotally mounted within a supporting assembly, generally designated 14 by a pivot structure, generally designated 16.

The pivot structure 16 is secured to a support structure 18 shown in phantom in FIG. 1 which forms part of the supporting assembly 14. The pivot structure 16 is generally disposed between the mirror assembly 12 and the support structure 18 of the mirror support assembly 14 so that the mirror assembly 12 can be moved with respect to the supporting assembly 14 and held in an adjusted operating position by the pivot structure 16. A shape memory alloy power pack assembly, generally designated 20, which includes a plurality of power operated mirror moving mechanisms described and illustrated herein, is included in the rearview mirror assembly 10 to provide powered adjustment of the mirror assembly 12 with respect to the mirror support assembly 14.

The support structure 18 is made of a plastic or other suitable material and is rigidly secured to a shell-like portion 23 of the mirror support assembly 14 by a plurality of posts 25 in a conventional manner. The shell-like structure 23 can be a plastic or other suitable material and forms the forwardly facing exterior of the rearview mirror assembly 10. The supporting assembly 14 is suitably fixed to an exterior side of a motor vehicle (not shown) as, for example, to the forward portion of a side door thereof.

The supporting assembly 14 can be of any conventional construction and need not be a fixed support but could be a spring-biased manual or powered fold-away support assembly of any known construction. The rearview mirror assembly 10 shown in the FIG. 1 is configured for installation on the left side of a vehicle where the left reference direction is determined from the point of view of a forwardly facing vehicle occupant. It is understood, however, that the assembly 10 could easily be reconfigured for operation on the right side of a vehicle by constructing a mirror image configuration of the rearview mirror assembly 10.

The present invention is more particularly concerned with the manner in which the mirror assembly 12 is adjustably pivotally mounted to and moved with respect to the support structure 18 by the shape memory alloy power pack assembly 20 than with the configuration and construction of the supporting assembly 14 and the attachment thereof to the vehicle or the manner in which the support structure 18 is rigidly secured within the supporting assembly 14, all of which may be conventional.

The mirror assembly 12 generally includes a mirror 22 and a mirror holder 24 within which the mirror 22 is mounted in fixed relation. The pivot structure 16 includes a friction cup structure 26 integrally formed with the mirror holder 24, a slip cup structure 28, a push nut spring structure 30 and a central post structure 32. A support cup structure 33 on the support structure 18 frictionally engages and supports the friction cup structure 26 in a manner described below.

The power operated mirror moving mechanisms of the shape memory alloy power pack assembly 20 are shown in FIG. 1 and include a first power operated mirror moving mechanism, generally designated 36, that is constructed and arranged to selectively effect movement of the mirror assembly 12 with respect to the supporting assembly 14 about a first axis of pivotal movement where the first axis is generally parallel to the ground when the vehicle is parked on a level surface.

The power pack assembly 20 further includes a second power operated mirror is constructed and arranged to selectively effect movement of the mirror assembly 12 with respect to the supporting assembly 14 about a second axis of pivotal movement where the second axis is generally perpendicular to the ground when the vehicle is parked on a level surface and is generally perpendicular to the first axis.

The first power operated mirror moving mechanism 36 includes a first pair of force applying structures 40 constructed and arranged to apply forces between the supporting assembly 14 and the mirror assembly 12 on opposite sides or ends of the first axis in contracting and extending relation therebetween.

The second power operated mirror moving mechanism 38 includes a second pair of force applying structures 42 constructed and arranged to apply forces between the supporting assembly 14 and the mirror assembly 12 on opposite sides or ends of the second axis in contracting and extending relation therebetween.

In the preferred embodiment of the invention, the first and second pairs of force applying structures 40, 42 are each comprised of pairs of essentially identical helical or coiled structures. The first pair of helical structures are designated 44 and 46 for reference and the second pair of helical structures are designated 48 and 50 for reference. Each helical structure 44, 46, 48, 50 is comprised of a shape memory alloy wire that has preferably been manufactured in the form of a coil spring. The preferred coil spring shape memory alloy wire is a nickel/titanium alloy wire commercially available from the Raychem Corporation, the Corporate Headquarters of which is located at 300 Constitution Drive, Menlo Park, Calif. 94025-1164 and has a wire diameter of approximately 0.4 mm, a free length when heated above the transition temperature of approximately 20 mm and a cold stretched length below the transition temperature of about 140 mm. These coil springs are operated between the lengths of about 140 mm to about 110 mm.

One skilled in the art will understand, however, that other shaped memory alloy wires having similar characteristics can also be used. A nickel/titanium wire manufactured by and commercially available from Dynalloy Inc., 18622 MacArthur Blvd., Ste. 103, Irvine, Calif. 92715 and sold under the trademark Flexinol®, for example, can be shaped into a coil spring structure and used as a force applying structure in the present invention.

The general properties and characteristics of shape memory alloy wires are well known to those skilled in the art. It is well known that shape memory alloy wire can be constructed to form a coil that shortens or contracts when heated and lengthens and can be relatively easily stretched when cooled. More specifically, when heated through an alloy-specific temperature range, shape memory alloys undergo a phase transition from a martensitic phase to an austenitic phase in which the coiled wire contracts to a memory position, reducing the height of the coil and applying a significant pulling force as it contracts. The rearview mirror assembly 10 is constructed so that each coiled wire can be individually heated by conducting an electrical current therethrough to effect the contracted memory position. When the current is switched off, the coil structure cools and can be easily stretched to mechanically transform the coil structure to a martensitic phase. When the heat is no longer applied the helical structure acts as a normal coil spring.

FIG. 1 shows that the helical structures 44, 46, 48, 50 are circumferentially spaced about the pivot structure 16 at approximately 90 degree angles and are equally spaced from the pivot structure 16. FIGS. 2–3 show the details of the mounting of the helical structures 44, 46 in force applying relation between the mirror support assembly 14 and the mirror assembly 12. FIGS. 2 and 3 are fragmentary cross-sectional views of the rearview mirror assembly 10 taken through the line designated 3,2—3,2 in FIG. 1 which coincides with the first axis. FIG. 2 will be discussed first. FIG. 2 shows two of the helical structures 44, 46 mounted between the support structure 18 and the mirror assembly 12 in opposing force applying relation along the first axis to pivot the mirror assembly 12 in opposite pivotal directions with respect to the pivot structure 16 and shows the pivot structure 16 in cross-sectional view.

The pivot structure 16 includes the support cup structure 33 and the central post structure 32, both of which are integrally formed with the support structure 18. The friction cup structure 26 is integrally formed with the mirror holder 24 portion of the mirror support assembly 14 and is slidably received within the support cup structure 33. The mirror holder 24 can be plastic or other appropriate material.

The central post structure 32 extends through a central aperture S1 in the friction cup structure 26; a middle aperture 53 on the push nut spring structure 30 is press-fit over the central post structure 32 to hold the friction cup structure 26 in frictional engagement between the support cup structure 33 and the slip cup structure 28.

More specifically, the friction cup structure 26 is held in an adjusted operating position through the frictional engagement therewith by the slip cup structure 28 and the support cup structure 33. It can be appreciated from a comparison of the positions of the mirror assembly 12 with respect to the mirror support assembly 14 in FIGS. 2–3 that the friction cup structure 26 is slidably movable with respect to the support cup structure 33 and the slip cup structure 28. The slip cup structure 28 does not move with respect to the push nut spring structure 30 as the mirror assembly 12 is pivoted.

Frictionally engaged surfaces 55 and 57 of the support cup structure 33 and friction cup structure 26, respectively, and frictionally engaged surfaces 60 and 62 of the friction cup structure 26 and slip cup structure 28, respectively, define sections of spherical surfaces to facilitate omnidirectional pivotal movement of the mirror assembly 12 with respect to the support structure 18 about the pivot structure 16.

Although only the first pair 40 of force applying helical structure 44,46 is shown in FIGS. 2–3, one skilled in the art will appreciate that the structure, mounting and operation of the second pair of force applying structures 42 is identical and the following discussion applies equally to those structures. A first end 62 of each shape memory alloy helical structure 44, 46 is secured to an anchor structure 64 on the support structure 18 of the mirror support assembly 14 and a second end 66 of each helical structure 44, 46 is secured to an anchor structure 68 on the mirror assembly 12.

The first end 62 of each helical structure 44, 46 is in electrical communication with a switch controlled automotive electrical power source and the second end 66 thereof is in electrical communication with the electrical system ground level voltage on the mirror assembly 12 so that each helical structure 44, 46 can be supplied electrical power either separately or in selected pairs to heat the same. These electrical connections are conventional and are not shown in FIGS. 1–3 to more clearly illustrate the invention.

Preferably the helical structures 44, 46 are mounted between the mirror support assembly 14 and the mirror assembly 12 so that they exert a tensile force therebetween in the martensitic or low temperature phase, regardless of the operating position of the mirror assembly 12. Thus, the helical structure 44, 46 would tend to move the mirror assembly 12 and the mirror support assembly 14 toward one another.

When the helical structures 44, 46 are at normal operating temperatures, these combined spring forces exerted on the mirror assembly 12 are insufficient alone or in combination to overcome the static frictional force of the pivot structure 16 so the mirror assembly 12 remains stationary in all positions of adjustment.

FIGS. 2–3 show an example of what occurs when helical structure 44 is heated above the transition temperature thereof and contracts towards its memory position to move the mirror assembly 12 in a first pivotal direction along the first axis. FIG. 2 shows the first power operated mirror moving mechanism 36 when the mirror assembly 12 is in a first position and each helical structure 44, 46 is in its martensitic or nonactuated phase.

When the helical structure 44 is heated with an electrical current, it contracts toward its memory position and exerts a much higher force on the mirror support assembly 14 than it does during its nonactuated, low temperature phase. The memory position of each structure 44, 46 is a coil structure having a height at least short enough to move the mirror assembly 12 fully through its operational range in a given pivotal direction. When the electrical current is switched on, the contraction begins essentially instantaneously. This contractionary force is sufficient to overcome the static frictional force holding the friction cup structure 26 in the pivot structure 16 and the spring force of the -opposing helical structure 46 which is in its nonactuated phase and thereby effect the repositioning of the mirror.

FIG. 3 shows the mirror assembly 12 in a second adjusted operating position after the contracting helical structure 44 has moved the mirror assembly 12 in the first pivotal direction about the first axis and the electrical current has been cut off. The contraction stops immediately and the pivot structure 16 holds the mirror assembly 12 in the new position.

A comparison of FIGS. 2–3 indicates that as the helical structure 44 contracts, the opposing helical structure 46 moves and expands in response to the movement of the mirror assembly 12. This movement of the opposing helical structure 46 cools the shape memory alloy material because during expansion each loop-like segment of the helix moves into a region of cooler air. The cooling of the helical structure 46 during the expansion is particularly important if the helical structure 46 has recently been actuated and its temperature is elevated. Cooling helps transform the alloy back to the martensitic phase. Each helical structure 44, 46 has a small diameter and cools essentially instantaneously.

The transition temperature for the selected shape memory alloy material is preferably high (it is preferably above 80 degrees Celsius and is preferably about 90 degrees Celsius) so that when the electrical current is cut off, the temperature differential between the heated helical structure 44 and the ambient atmosphere is high which facilitates rapid cooling.

The opposing helical structure 46 is stretched as it is moved through the air by the pivoting mirror assembly 12. This stretching of the helical structure mechanically converts the shape memory, alloy therein to the martensitic phase thereby decreasing the recovery time of the helical structure 46 assuring that it can be reactuated essentially instantaneously to move the mirror assembly 12 in the second pivotal direction along the first axis.

Because of the rapid cooling of the helical structure 44 due to the high temperature differential, the small wire diameter and the stretching of the helical structure 46 which reduces recovery time, the mirror assembly 12 can be immediately repositioned in the second pivotal direction along the first axis by heating the helical structure 46 and stretching the helical structure 44 after the current to the helical structure 44 has been switched off.

As aforesaid, in the preferred embodiment, the helical structures 44, 46 are selected and mounted in force applying relation between the mirror assembly 12 and the mirror support assembly 14 such that they exert a tensile force therebetween in all adjusted operating positions of the mirror assembly 12 in the martensitic phase. It is wlect and mount helical structures 44, 46, 48, 50 that exert a compressionary force, i.e., a force that tends to move the mirror assembly 12 away from the mirror support assembly 14 in all adjusted operating positions of the mirror assembly 12 when the helical structures 44, 46, 48, 50 are in their martensitic phase and to exert a strong tensile force between the mirror assembly 12 and mirror support assembly 14 when actuated to the austenitic phase.

It is further contemplated to select and mount the helical structures 44, 46, 48, 50 such that they can exert either a compression or tensile force therebetween, when the same are in their martensitic or low temperature phases, depending on the adjusted operating position of the mirror assembly 12 with respect to the mirror support assembly 14. Thus it can be understood that in this configuration, each spring would pass through a null position or zero force position in its martensitic phase at some point within the operating range of adjustments of the mirror assembly 12. Although one or more coils may be in the null position when the mirror assembly 12 is in a given operating position and may not be applying a force, nevertheless for every other position of the mirror assembly 12 the coils do apply a force and, hence, they are regarded in accordance with the broadest aspects of the present invention to be force applying structures.

It is also understood that in all embodiments, the mirror assembly 12 is repositioned by the contraction of the selected helical structure or helical structures in response to the heating thereof and that the tensile force generated by a helical structure in its austenitic or heated phase is much greater than the spring force, tensile or compression, generated by the helical structures 44, 46, 48, 50 alone or in combination in their martensitic or low temperature phases. Consequently, the individual or combined spring forces of the helical structures 44, 46, 48, 50 in their martensitic phases does not element of the mirror assembly 12 when the same is moved by an actuated helical structure and the individual or combined spring forces of the helical structures in their martensitic phases are sufficiently balanced that the mirror assembly 12 remains stationary until a helical structure 44, 46, 48, 50 is contracted by heating in all positions of adjustment.

Adjacent pairs of helical structure 44, 46, 48, 50, as for example structures 44 and 48, can be simultaneously actuated to reposition the mirror assembly 12 at the same time. It is contemplated that an appropriate switching mechanism be provided remote from the rearview mirror assembly 10 in the interior of the vehicle proximate the left side front seat that would allow actuation of any individual helical structure 44, 46, 48, 50 or simultaneous actuation of any adjacent pair, but would not allow simultaneous actuation of helical structures in opposing relationship, as for example, structures 44 and 46.

FIGS. 4–9 show an alternative embodiment of a rearview mirror assembly, generally designated 110. Identical structures between the two embodiments 10 and 110 are given identical reference numbers and are not described further.

Figure 4:
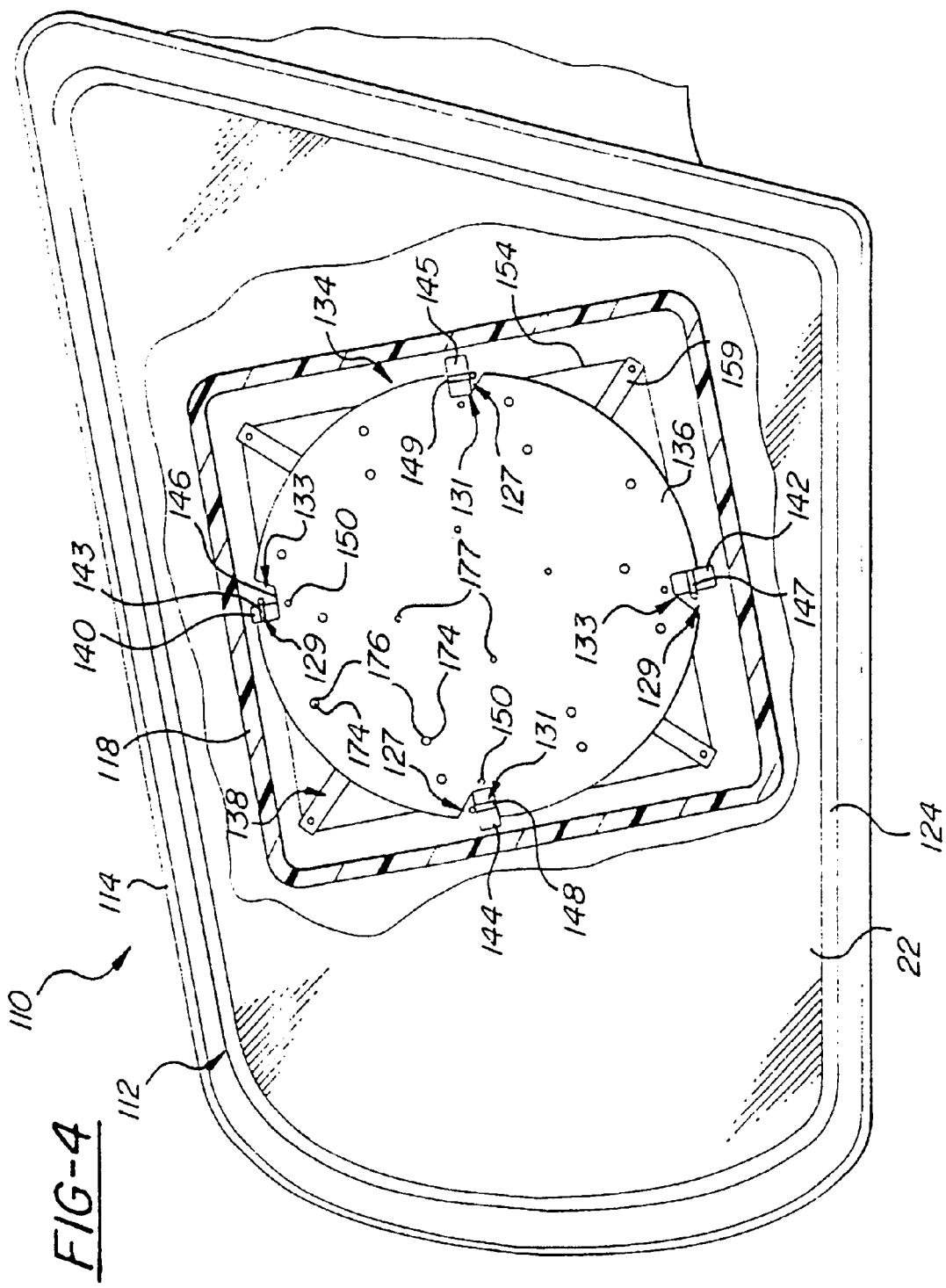
FIG. 4 is an elevational view of a second embodiment of a rearview mirror assembly showing a view similar to FIG. 1 with portions including a pivot structure broken away to show a portion of a shape memory alloy power pack assembly.

FIG. 4 shows a view of the rearview mirror assembly 10 similar to the view of the rearview mirror assembly 10 shown in FIG. 1. In FIG. 4 some structures have been removed including the pivot structure 16 and a portion of a housing structure 118 to show a portion of a shape memory alloy power pack assembly, generally designated 134, which is generally disposed within the housing structure 118.

The housing structure 118 is secured within and forms part of a mirror support assembly, generally designated 114. A mirror assembly 112 is pivotally mounted on the housing structure 118 portion of the mirror support assembly 114 by a pivot structure 16.

The power pack assembly 134 includes a first power operated mirror moving mechanism generally designated 127 constructed and arranged to selectively move the mirror assembly 112 with respect to the mirror support assembly 114 about a first axis that is essentially horizontal to the ground when the vehicle is parked in a level surface.

The power pack assembly 134 further includes a second power operated mirror moving mechanism generally designated 129 constructed and arranged to selectively move the mirror assembly 112 with respect to the mirror support assembly 114 about a second axis that is essentially vertical to the ground when the vehicle is parked in a level surface and is generally perpendicular to the first axis.

The first power operated mirror moving mechanism 127 includes a first pair of force applying structures, generally designated 131, constructed and arranged to apply forces between the mirror assemblies 112, 114 on opposite sides of the first axis in contracting and extending relation therebetween and the second power operated mirror moving mechanism 129 includes a second pair of force applying structures, generally designated 133, constructed and arranged to apply forces between the mirror assemblies 112, 114 on opposite sides of the second axis in contracting and extending relation therebetween.

The power pack assembly 134 is comprised of a cylindrical disk-shaped base member 136 and a plurality of spring biasing assemblies 135. A plurality of spring biased arm members 138, each of which forms part of a spring biasing assembly 135, slidably mounted on the base member 136 and a plurality of post members including an upper post member 140, a lower post member 142 and first and second side post members 144 and 145, respectively.

The upper, lower and side post members 140, 142, 144, 145 are each rigidly secured within respective angular notches 146 formed at the periphery of the base member 136. The post members 140, 142, 144, 145 are essentially equally circumferentially spaced at the periphery of the base member 136 so that they are approximately 90° (ninety degrees) apart and are positioned respectively at the top, bottom and sides of the base member 136 when the same is installed in the rearview mirror assembly 10. Each post member 140, 142, 144, 145 is cylindrical and defines a central annular groove thereabout, designated 143, 147, 148 and 149, respectively. Each post member 140, 142, 144, 145 is cylindrical and the diameters thereof are unequal for reasons explained hereinbelow.

The base member 136 is preferably made of a light weight electrically conductive material such as aluminum, although a nonconductive material such as plastic or a composite material could be used. Each spring biasing assembly 135 includes an arm member 138 and an associated pulley 151, 152, 153, or 155. The post members 140, 142, 144, 145 are preferably made of plastic or a composite material. Each post member 140, 142, 144, 145 is provided with a reduced diameter cylindrical extension member (not shown) integrally and axially symmetrically formed at one end thereof, each of which is received within respective blind bores (not shown) formed in each notch 146. More specifically, each peripheral edge portion of the base member 136 within each notch 146 includes a bore that receives the respective extension member and the extension members are hd fastener members 150.

Each arm member 138 is provided with a pulley member designated 151, 152, 153, 155 rotatably mounted thereon through which each arm member 138 engages a force applying shape memory alloy strand member 154. As will become apparent, two opposing strand members 154 comprise the first pair of force applying structure 131 and the other opposing pair of strand members 154 comprise the second pair of force applying structure 133. Each pulley member 151, 152, 153, 155 is given a different reference numeral because each is a different height, for reasons explained hereinbelow.

Figure 5:
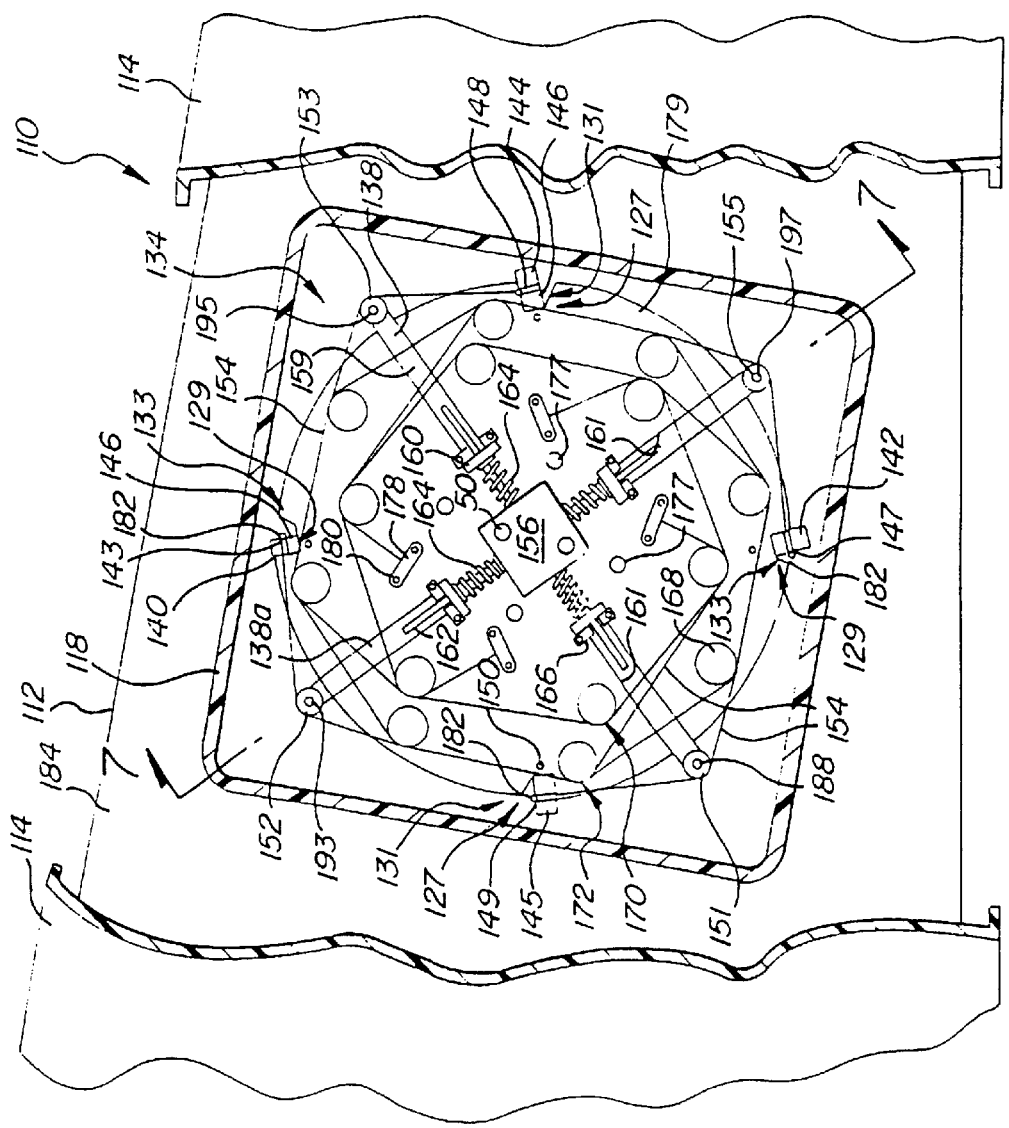
FIG. 5 is a fragmentary elevational view looking rearwardly at the front of the mirror assembly with portions thereof broken away to show the shape memory alloy power pack assembly.

FIG. 5 shows an enlarged elevational view of the opposite side of the power pack assembly 134 from that shown in FIG. 4. More specifically, FIG. 5 is a view of the rearview mirror assembly 110 seen when looking rearwardly at the front of the supporting assembly 14; the supporting assembly 14 and the housing structure 118 are shown in fragmentary view so that the power pack assembly 134 is illustrated.

A central block member 156 is secured to a central portion of the base member 136 by threaded fasteners 158. Each spring biasing assembly 135 includes an arm member 138 and an associated pulley 151, 152, 153 or 155. Each arm member 138 includes an arm portion 159 slidably engaged within a groove structure 161 in the base member 136 and an outwardly protruding mounting block portion 160 integrally formed therewith at an end of the arm portion 159 opposite the pulley member 151, 152, 153, 155. Each block portion 160 is slidably engaged with a rod structure 162, each of which rod structures 162 is rigidly mounted to the central block member 156. A coil spring member 164 surrounds each rod structure 162 and biases the respective arm member 138 radially outwardly along the groove structure 161. A pair of stop members 166 are secured in blocking relation over each groove structure 161 to limit the radially outwardly sliding movement of each arm member 138 under the spring force prber 164.

A plurality of identical lateral post members 168 are rigidly secured to the base member 136 and are arranged thereon to form two radial tiers which are comprised of an inner tier, generally designated 170 and an outer tier, generally designated 172. Each lateral post member 168 is generally cylindrical and includes a reduced diameter cylindrical extension member 74 integrally and axially symmetrically formed at one end thereof. Each extension member 174 is secured within a bore 176 in the base member 136 to secure the lateral post members 168 to the base member 136. The extension members 174 and bores 176 are shown in FIG. 4. The inner tier 170 is comprised of six symmetrically and circumferentially spaced lateral post members 168 and the outer tier is comprised of eight symmetrically and circumferentially spaced lateral post members 168. The base member 136 is secured to the housing structure 118 through conventional threaded fasteners 177.

Four shape memory alloy strand members 154 are mounted on the power pack assembly 134 in the following manner: a first end of each strand member 154 is secured by a holder structure 178 which holder structure is secured to the base member 136 with conventional fasteners 180. It is understood that it is within the scope of the invention to secure the first end of each strand member 154 to any appropriate structure to anchor each strand member 154, including some portion of the mirror support assembly 114 itself.

Figure 6:
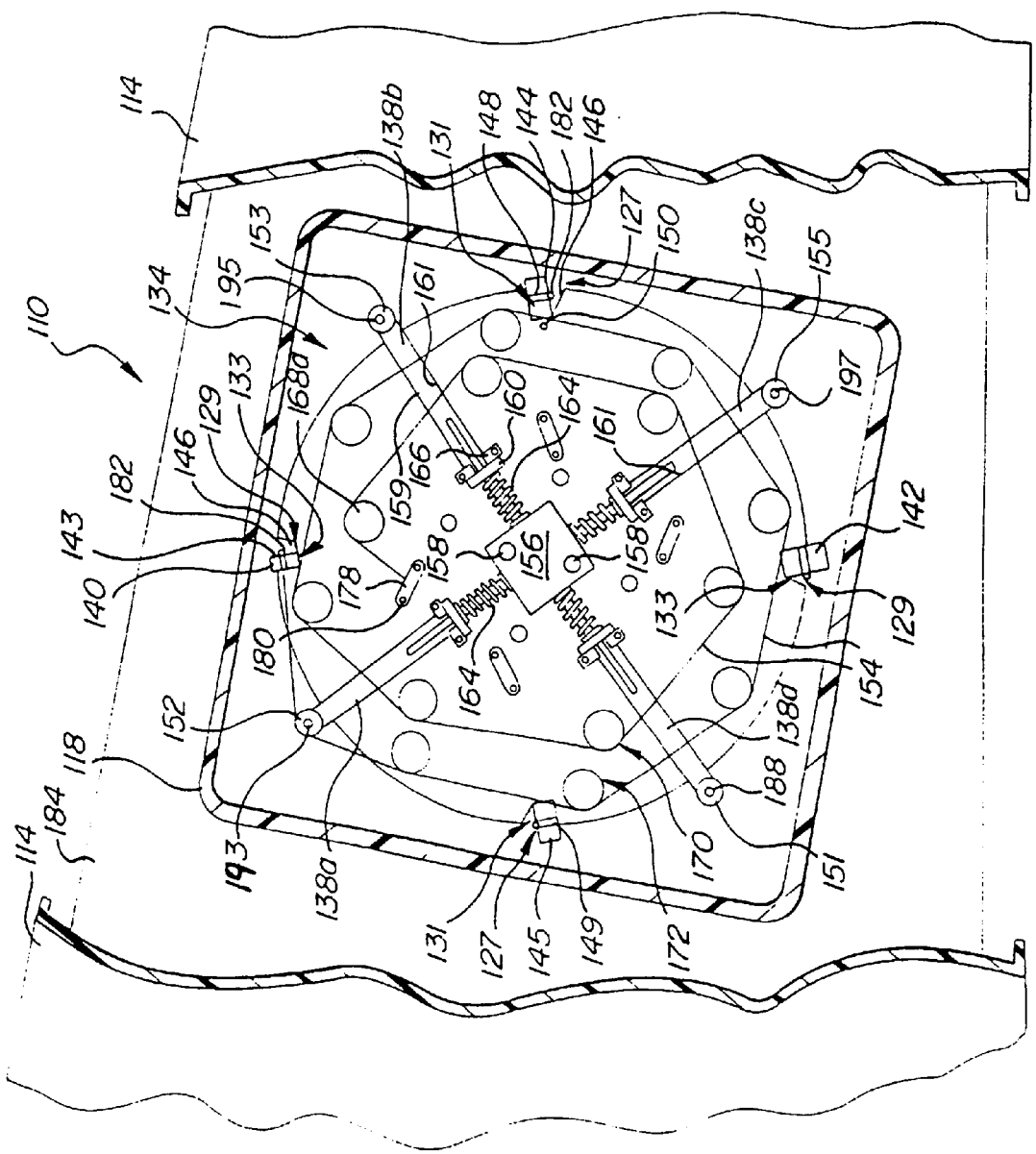
FIG. 6 is a view similar to FIG. 5 showing a single strand member mounted in the power pack assembly.

Generally, each strand member 154 is wound around a plurality of lateral post members 168 in a spiral-like configuration and then around one of the pulley members 151, 152, 153, 155 of a respective spring biasing assembly 135 and then each strand member 154 engages one of the upper, lower or side post members 140, 142, 144, 145. The details of this mounting is shown in FIG. 6 which shows the mounting of a representative single strand member, designated 154a. The other strand members 154 are not shown so that this representative example can be better understood. It can be appreciated that the other three strand members 154 are mounted in a similar manner.

The representative strand member 154a shown in FIG. 6 is secured at a first end thereof between the holder structure 178 and the base member 136. The holder structure 178 is held tightly to the base member 136 by threaded fasteners 180 to hold the first end of the strand member 154a securely in place. The strand member 154a is wound around the lateral post members 168 starting with a proximate post member which is labeled 168a for reference. The strand member 154a is then wound around a plurality of other lateral post members 168 in the inner tier 170 thereof and then wound around the outer tier 172 lateral post members 168.

The strand member 154a engages pulley member 152 and then engages the annular groove 143 in the upper post member 140. The strand member 154a passes though an appropriate aperture 182 in the housing structure 118 and the second end of the strand member 154a is secured to an essentially forwardly facing surface 184 of the mirror assembly 112 in a manner described hereinbelow. The post members 140, 142, 144, 145 and 168 and the pulley members 151, 152, 153, 155 together comprise a plurality of spaced elements which cooperate to form a plurality of elongated paths on the mirror support assembly 114 which support the shape memory alloy strand members 154 and direct the same to the mirror assembly 112.

In the embodiment shown in the drawings there are eight lateral post members 168 in the outeeach arm member 138 is symmetrically between two adjacent lateral post members 168 in the outer tier 172. The post members 140, 142, 144, 145 are, as described, essentially 90 degrees apart and the arm members 138 are also essentially 90 degrees apart from each other. The arm members are labeled 138a, 138b, 138c and 138d in FIG. 6 for reference. The arm member 138a is approximately an equal radial distance from the two adjacent post members 140 and 145; similarly, the other arm members 138b, 138c and 138d are essentially an equal radial distance from the adjacent post members 140 and 144; 144 and 142; and 142 and 145, respectively.

In the embodiment shown in FIGS. 4–9, each strand member 154 spirals outwardly in a clockwise direction. As explained hereinbelow, each first end of each shape memory alloy strand member 154 is in electrical communication with a switch controlled automotive electrical power source and the second end thereof is in electrical communication with the electrical system ground voltage level so that each strand member 154 can be supplied electrical power either separately or in selected pairs to effect the contraction of the selected strand member 154 or strand members 154 to pivot the mirror assembly 112.

It can therefore be appreciated that the four strand members 154 are provided to effect the pivotal movement of the mirror assembly 112 in four different pivotal directions. To this end, each strand member 154 engages one pulley member 151, 152, 153 or 155 and then the upper, lower or side post member 140, 142, 144 or 145 that is immediately adjacent thereto in the clockwise direction. FIGS. 4–6 and 9 show that the upper and lower post member 140, 142 are vertical aligned so that the respective strand members 154 engaged therewith can be appropriately secured to the front surface 184 of the mirror assembly 112 in vertical alignment in proper position relative to the pivot structure 16 to control the up or down pivotal movement of the mirror assembly 112. These two strand members 154 comprise the second pair of force applying structure 133. Similarly, the side post members 144, 145 and the strand members extending therefrom are approximately horizontally aligned to facilitate the side to side pivotal movement of the mirror assembly 112. These two strand members 154 comprise the first pair of force applying structure 131.

Figure 7:
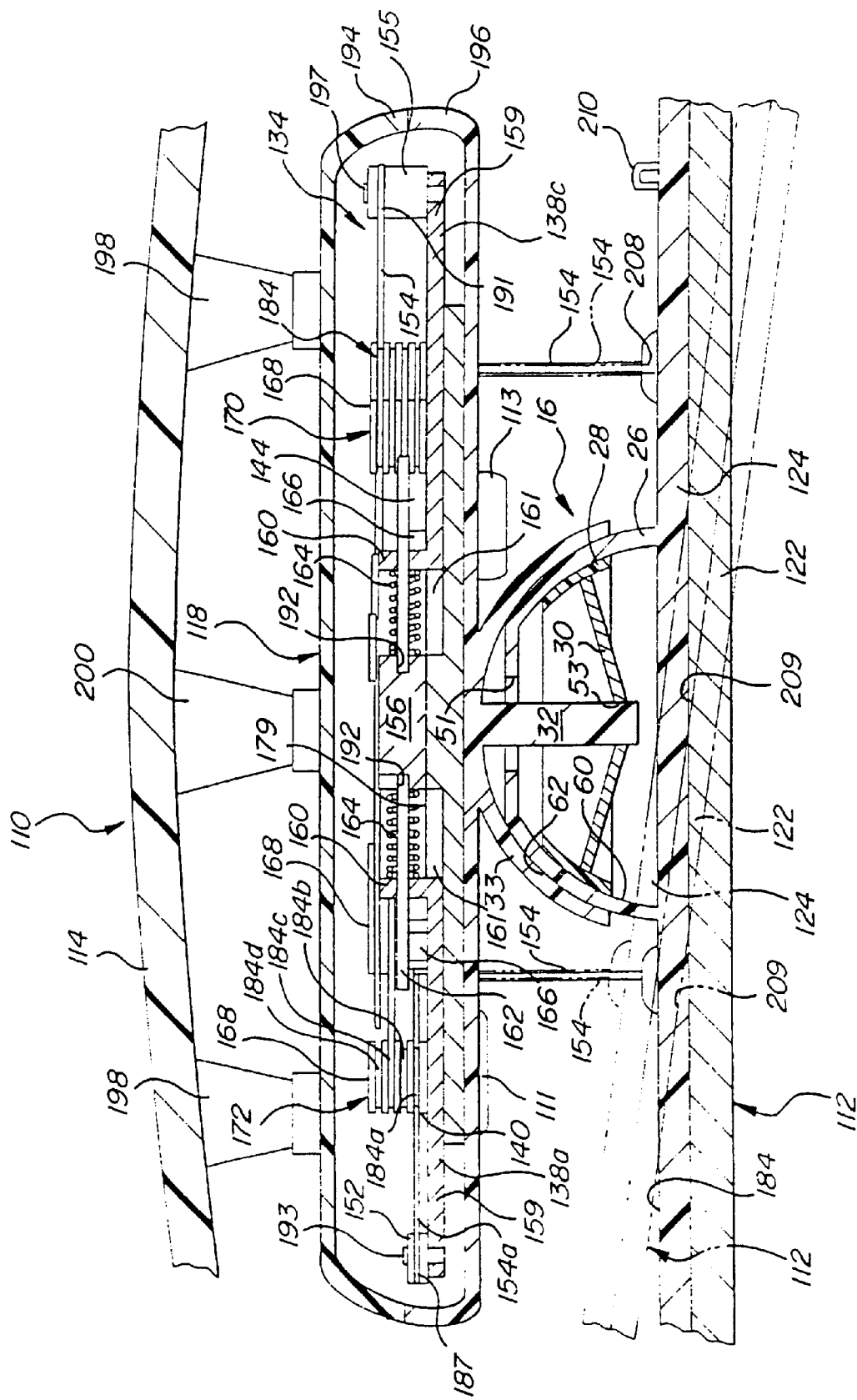
FIG. 7 is a fragmentary cross-sectional view taken through the line 7—7 in FIG. 5.
Figure 8:
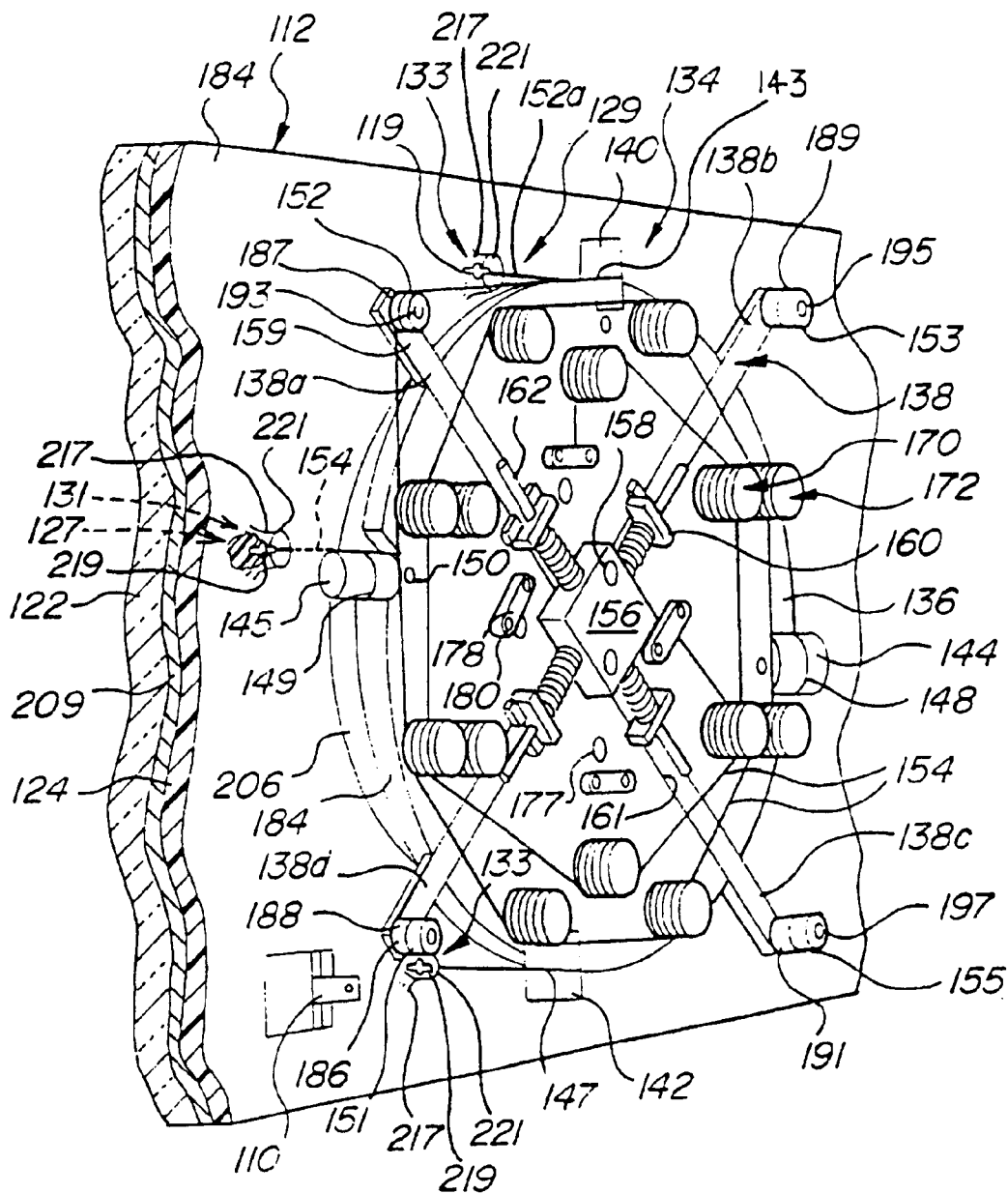
FIG. 8 is an isolated perspective view showing the power pack assembly, the pivot structure and a mirror unit.

Details of the mounting of the strand member 154 about the lateral post members 168 are shown in FIGS. 7–8. Each lateral post member 168 is provided with four identical annular grooves generally designated 184, and designated 184a through 184d for reference in FIG. 7. Each pulley member 151,152,153,155 is provided with a single annular groove 186,187,189,191, respectively, to receive a single strand 154. Each pulley member 151,152,153,155 is rotatably mounted on a respective arm member 138 by pin member 188,193,195,197.

It can be appreciated the strand member designated 154a for reference in FIG. 7 is maintained in essentially a single plane parallel to the surface 179 of the base member 136 as the strand member 154a spirals outwardly toward the upper post member 140. This planar configuration of the spiraling strand member 154a is achieved because the annular groove 87 on the pulley member 152 and the annular groove 143 on the upper post member 140 are both the same distance from the surface 179 as the first groove 184a on each lateral post member 168.

Similarly, although only partially shown in FIG. 7, it can be appreciated that the groove 191 on pulley member 155 and the annular groove 147 (not shown in FIG. 7) on the lower post member 142 are the same distance from surface 179 as the fourth groove 184d on each lateral post member 168. It will be understood that the post members 140, 142, 144, and 145 are unequal diameters and that the pulley members 151,52,53,55 are unequal heights so that associated pairs thereof correspond in distance from surface 179 to one of the grooves 184a through 184d on the lateral post members 168 to maintain the four spiraling strand members 154 essentially parallel to each other and to surface 179 of the base member 136. It will also be understood that because each lateral post member 168 is provided with four separate groove structures, the spiral winding of the strand members 154 can be effected without having two strand members 154 in the same annular groove and that each strand member 154 can be maintained in an essentially planar confi.

One end of each rod structure 162 is rigidly secured within a blind bore 192 in the central block member 156. Each rod structure 162 passes through an aperture 190 in the block portion 160 of the arm member 138 associated therewith to effect the slidable mounting of each arm member 138 on one of the rod structures 162.

The housing structure 118 is comprised of complimentary first 194 and second 196 housing members which are secured together by threaded fasteners (not shown) or by any conventional means. The housing structure 118 is secured with threaded fasteners (not shown) or by other conventional means to a plurality of legs structures 198, 200 integrally formed on the supporting assembly 14. The second housing member 196 is provided with enlarged portions 111 and 113, respectively, to accommodate the post members 140 and 144. Enlarged portions (not shown) are provided for post members 142 and 145.

The pivot structure 16 is shown in the cross-sectional view of FIG. 7. The structure the pivot structure 16 is essentially the same in both embodiments 10, 110 so a discussion of the structure will not be repeated in detail. The support cup structure 33 and the central post structure 32 are both of which are integrally formed with the second housing member 196, but this is not considered a major difference in construction.

It can be appreciated from the phantom representation of the pivoted mirror unit in FIG. 7 that the pivot structure 16 friction cup structure 26 is slidably movable with respect to the support cup structure 33 and the slip cup structure 28.

The second end of each strand member 154 is provided with an enlarged member 208 which facilitates the attachment of the respective strand member 154 to an integral attachment structure 217 on the holder member 124. The enlarged member 208 can be a hollow cylindrical structure made of a soft metal that is crimped around the strand member 154. As best seen in FIG. 8, the integral attachment structure 217 includes a side opening 219 which receives the strand 154 and the enlarged member 208 and a top aperture 221. The top aperture 221 has a large enough diameter to allow the strand member 154 to pass therethrough but is small enough to prevent the enlarged member 208 from passing therethrough so that the strand member 154 is secured to the mirror assembly 112. The second end of each strand member 154 is in electrical communication with a conductive structure 209 within the mirror assembly 112 which is in turn in electrical communication with terminal member 210 which are connected through a wire member (not shown) to ground voltage of the vehicle.

It can be appreciated from FIG. 8 that respective second ends of the strand members 154, two of which are shown in phantom, one of which is shown in solid lines and one of which is not visible, are circumferentially spaced around the pivot structure 16 essentially ninety degrees apart and are positioned to move the mirror assembly 112 upwardly, downwardly and side-to-side. FIG. 8 shows the power pack assembly 134 with only one strand member, designated 154a, mounted therein. The other three are not shown to more clearly illustrate the invention.

It is well known that strand members 154 that contain a shape memory alloy can be constructed so that each strand member 154 independently shortens when heated and lengthens or can be relatively easily stretched when cooled. More specifically, when heated through an alloy-specific temperature range, shape memory alloys undergo a phase transition from a martensitic phase to an austenitic phase in which the strand member 154 effects a contracted or memory position. Each strand member 154 can be individually heated by placing an electrical current therethrough to effect the contracted memory position. When the current is switched off, the strand member 154 cools and can be easily stretched to mechanically transform the strand members 154 to a martensitic phase.

The preferred shape memory alloy for the strand members 154 is a nickel/titanium allow commercially available from Dynalloy, Inc. 18622 MacArthur Blvd., Ste 103, Irvine, Calif. 92715 and sold under the trademark Flexinol®. More specifically, the preferred Flexinol® wire has a 0.015 inch diameter and is rated to have a transition temperature of 90 degrees Celsius. It will be understood that other shape memory alloy wires can be used such as comparable shape memory alloy wires commercially available from Raychem, Inc. and sold under the trademark Nitinol®. The address of Raychem, Inc. is set forth above.

Figure 9:
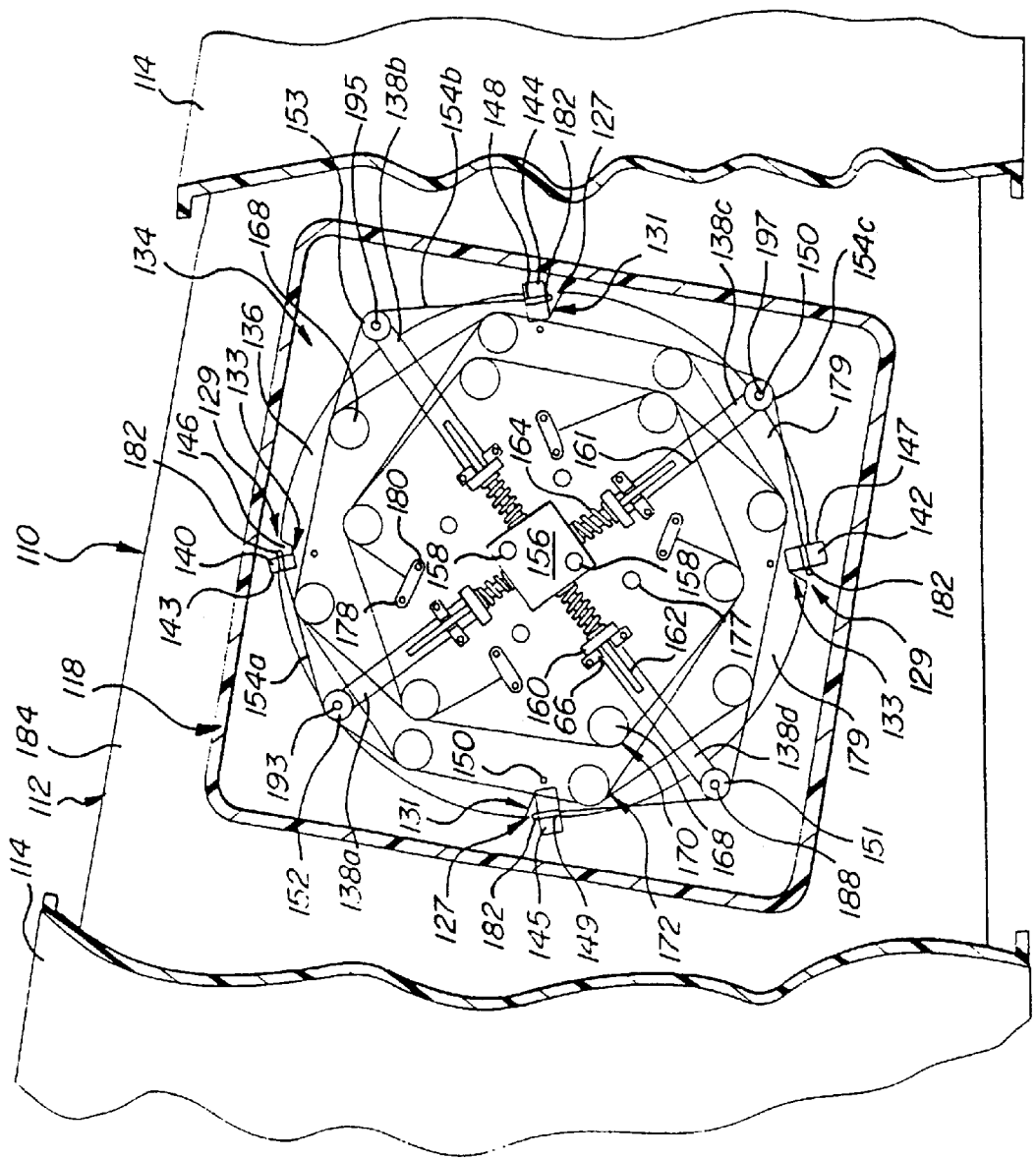
FIG. 9 is a view similar to FIG. 5 showing the power pack assembly in an actuated configuration.

The operation of the power pack assembly 134 can be appreciated by examining FIG. 9. Identical structures are given different letter designations for purposes of illustration. FIG. 9 shows an actuated configuration of the power pack assembly 134 realized when one of the strand members is heated by passing a current therethrough to reposition the mirror assembly 112. The energized strand member is designated 154a in FIG. 9 for reference. It can be appreciated that this strand member 154a engages the upper post member 140 and extends rearwardly therefrom for attachment to an upper portion of the forwardly facing surface 184 of the mirror assembly 112 and is attached above the pivot structure 16 to upwardly pivot the mirror assembly 112. It can also be appreciated that the strand member designated 154c is in opposing relationship to strand member 154a and is secured to the surface to structure to downwardly pivot the mirror unit when contracted. Strand members 154a and 154c are also shown and labeled in FIG. 9.

When strand member 154a is heated, it shortens toward its memory position. This causes the arm member of the spring biasing assembly 135 associated therewith, designated 138a for reference, to slide radially inwardly to a fully contacted position. The fully contracted position is realized when the associated spring member 164a is fully compressed. After arm member 138a is fully contracted, further shortening of the strand member 154a causes the mirror assembly 112 to pivot upwardly about the pivot structure 16. More specifically, further shortening of the strand member 154a after the arm member 138a is fully contracted causes the friction cup structure 26 to slide with respect to both the support cup structure 33 and the slip cup structure 28.

As the mirror assembly 112 pivots, the pivoting motion of the mirror unit simultaneously stretches the opposing strand member 154c and at least partially contracts the arm member 138c associated therewith which compresses the spring member 164c associated therewith. When the mirror assembly 112 reaches the desired adjusted operating position, the strand member 154a is de-energized causing it to stop contracting. The pivot structure 16 holds the mirror assembly 112 in the new adjusted operating position.

After the mirror assembly 112 is in the desired adjusted operating position and the power is turned off, the compressed spring members 164 of the spring biasing members 135 stretch the strand members 154 associated therewith. In general, the spring force provided by the spring members 164 is great enough to stretch the strand members 154 when the strand members 154 are below their highest martensite transition temperature (sometimes referred to as the martensite initiation temperature), but not great enough to stretch a strand member 154 in the austenite phase. Furthermore, it can be appreciated that the spring force provided by a single coil spring members 164 (or by two adjacent coil spring members 164 if two adjacent strand members 154 are actuated simultaneously to reposition the mirror unit) is not great enough to cause the displacement of the friction cup structure 26 with respect to the support cup structure 33 and the slip cup structure 28. Therefore, when the actuated strand member 154, in the example above strand member 154a, is de-energized, the mirror assembly 112 does not pivot any farther and the compressed coil spring members 164 function to stretch both the strand members 154a, 154c to mechanically induce the martensite phase therein. It is understood that the actuated strand member 154a does not begin to stretch under this spring bias force until it has sufficiently cooled to enter the martensite phase, but this cooling is typically realized essentially instantaneously. The arm members 138a and 138c of the spring biasing assembly 135 slide radially outwardly until they contact the respective stop members 166 associated therewith. When this point is reached, the strand members 154 are in the martensite phase and either can be contracted when energized.

It is also understood that the strand members 154 would undergo this phase transition from austenite to martensite without the presence of the spring members 164, but this transition is facilitated by the spring force applied by these spring members 164 on the strand members 154. Hence, the spring members decrease the recovery time for the strand members which have been heated to contract the same. The arm members 138 hold the strand members 154 taut when they are in the non-energized state to maintain the strand members 154 within the grooves 184 on the lateral post members 168. Each strand member 154 therefore applies a force to the mirror assembly 112 when the strand members 154 are in their martensitic phase, and the mirror assembly 112 is stationary, but these forces are sufficiently balanced that the mirror assembly 112 remains stationary with respect to the mirror support assembly 14. The strand members 154b, 154d are similarly in opposing relationship and are independently energizable to contract either of the same to selectively reposition the mirror assembly 112 from side to side.

Adjacent pairs of strand members 154, as for example the strand members designated 154a and 154b in FIG. 7, can be simultaneously actuated to reposition the mirror assembly 112 at the same time. It is contemplated that an appropriate switching mechanism may be provided remote from the rearview mirror assembly 10 in the interior of the vehicle proximate the left side-front seat that would allow actuation of any individual strand member 154 or simultaneous actuation of any pair of adjacent strand members 154, but would not allow simultaneous actuation of strand members 154 in opposing relationship, as for example, strand members 154a and 154c.

It is understood that the foregoing embodiments are exemplary only and not intended to be limiting. One skilled in the are will appreciate, for example, that even though each the strand members 154 shown in the second embodiment is comprised entirely of shape memory alloy material throughout its length, this is not a requirement. A portion or portions of each strand member 154 can be comprised of a shape memory alloy and other portion or portions can be made of any suitable material, including any conductive material.

The invention has been described in an illustrative manner, and it is to be understood that the terminology which has been used is intended to be in the nature of words of description rather than of limitation.

Many modifications and variations of the present invention are possible in light of the above teachings and the invention may be practiced otherwise than as specifically described within the scope of the appended claims.

What is claimed is:

1. A rearview mirror for a vehicle comprising:
    a supporting assembly for attachment to a vehicle structure;
    a mirror assembly;
    a pivot structure between said assemblies for pivoting said mirror assembly relative to said supporting assembly about first and second perpendicular and intersecting axes;
    a first electrically actuated moving mechanism disposed to selectively effect movement of said mirror assembly with respect to said supporting assembly about said first axis;
    a second electrically actuated moving mechanism disposed to selectively effect movement of said mirror assembly with respect to said supporting assembly about said second axis;
    characterized by including a temperature sensitive element consisting of an alloy which undergoes thermoelastic, martensitic phase transformation in response to heat and reacting between said assemblies for straining said element during a first phase and for unstraining said element during a second phase, and in response to a supply of electrical power said element is actuated causing said phase transformation of said element to unstrain said element extracting energy from said element during said unstraining thereof to move said mirror assembly relative to said supporting assembly.

2. A mirror as set forth in claim 1 wherein said first mechanism includes a first pair of said elements to apply forces between said assemblies on opposite sides of said first axis, and said second mechanism includes a second pair of said elements to apply forces between said assemblies on opposite sides of said second axis.

3. A mirror as set forth in claim 2 wherein said first pair of elements are balanced for normally maintaining said mirror assembly stationary about said first axis in relation to said supporting assembly, and wherein said second pair of elements are balanced for maintaining said mirror assembly stationary about said second axis in relation to said supporting assembly.

4. A mirror as set forth in claim 3 wherein each of said elements contracts in response to heat to extract energy during said unstraining thereof.

5. A mirror as set forth in claim 4 wherein each of said elements heats in response to electrical current passing through said element.

6. A mirror as set defined in claim 2 wherein each of said elements comprises a wire of shape memory alloy preformed into a helical coil configuration, each helical coil wire having ends connected between said assemblies.

7. A mirror as set defined in claim 2 wherein said shape memory alloy has a transition temperature of 90° Celsius.

8. A mirror as set forth in claim 2 wherein each of said elements comprises a wire of shape memory alloy, each shape memory wire having one end thereof fixed to said mirror assembly and having a substantial length extending to said supporting assembly, each substantial length of shape memory alloy wire being held by spaced elements in an elongated path on said supporting assembly leading from an end thereof fixed to said supporting assembly to said mirror assembly.

9. A mirror as set forth in claim 8 wherein each substantial length of shape memory alloy wire is tensioned along its path by a spring biasing assembly.

10. A mirror as set forth in claim 9 wherein said shape memory alloy wire has a transition temperature of 90° Celsius.

* * * * *